United States Patent
Rajpathak

(10) Patent No.: US 8,452,774 B2
(45) Date of Patent: May 28, 2013

(54) METHODOLOGY TO ESTABLISH TERM CO-RELATIONSHIP USING SENTENCE BOUNDARY DETECTION

(75) Inventor: Dnyanesh Rajpathak, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/044,873

(22) Filed: Mar. 10, 2011

(65) Prior Publication Data

US 2012/0233132 A1  Sep. 13, 2012

(51) Int. Cl.
*G06F 7/00* (2006.01)
*G06F 17/30* (2006.01)

(52) U.S. Cl.
USPC ............... 707/738; 707/750; 707/754

(58) Field of Classification Search
USPC ............ 707/738, 750, 754; 704/2, 8, 9
See application file for complete search history.

(56) References Cited

U.S. PATENT DOCUMENTS

| | | | |
|---|---|---|---|
| 7,096,210 B1 | 8/2006 | Kramer et al. | |
| 7,185,008 B2 * | 2/2007 | Kawatani | 707/999.004 |
| 8,115,869 B2 * | 2/2012 | Rathod et al. | 348/465 |
| 2003/0167267 A1 * | 9/2003 | Kawatani | 707/6 |
| 2004/0230577 A1 * | 11/2004 | Kawatani | 707/6 |
| 2007/0106977 A1 * | 5/2007 | Arguelles | 717/115 |
| 2008/0204595 A1 * | 8/2008 | Rathod et al. | 348/465 |
| 2008/0254423 A1 * | 10/2008 | Cohen | 434/308 |
| 2008/0254424 A1 * | 10/2008 | Cohen | 434/308 |
| 2008/0254425 A1 * | 10/2008 | Cohen | 434/308 |
| 2008/0254426 A1 * | 10/2008 | Cohen | 434/308 |
| 2008/0313111 A1 * | 12/2008 | Padovitz et al. | 706/12 |
| 2011/0035094 A1 * | 2/2011 | Van Den Berg et al. | 701/33 |
| 2011/0099184 A1 * | 4/2011 | Symington | 707/755 |
| 2011/0119231 A1 * | 5/2011 | Namburu et al. | 707/609 |

OTHER PUBLICATIONS

Nolan, Mary et al., "Re-Engineering Legacy Tech Manual's Troubleshooting Procedures into Smart Model-Based Diagnostics", 0/7803-4162-7/97 1997 IEEE, pp. 1-7.

* cited by examiner

*Primary Examiner* — Phong Nguyen
(74) *Attorney, Agent, or Firm* — John A. Miller; Miller IP Group, PLC

(57) ABSTRACT

A method and system for splitting a text document into individual sentences using sentence boundary detection, and establishing co-relationships between terms which are present in the same sentence. A document corpus, or collection of text records, is provided, containing text with terms to be extracted. The text records in the document corpus are divided into individual sentences, using a set of rules for sentence boundary detection. The individual sentences are then analyzed to extract and correlate terms, such as parts and symptoms, symptoms and actions, or parts and failure modes. The correlated terms are then validated based on frequency of occurrence, with term pairs being considered valid if their frequency of occurrence exceeds a minimum frequency threshold. The validated term correlations can be used for fault model development, document classification, and document clustering.

16 Claims, 2 Drawing Sheets

METHODOLOGY TO ESTABLISH TERM CO-RELATIONSHIP USING SENTENCE BOUNDARY DETECTION

BACKGROUND OF THE INVENTION

1. Field of the Invention

This invention relates generally to rule-based parsing of text documents and, more particularly, to a method for establishing a co-relationship between terms in a document—including terms such as parts, service actions, symptoms, and failure modes—which uses sentence boundary detection to establish tentative term pairings, and then analyzes each tentative term pairing for validity.

2. Discussion of the Related Art

Modern vehicles are complex electro-mechanical systems that employ many sub-systems, components, devices, and modules, which pass operating information between and among each other using sophisticated algorithms and data buses. As with anything, these types of devices and algorithms are susceptible to errors, failures and faults that can affect the operation of the vehicle. To help manage this complexity, vehicle manufacturers develop fault models, which match the various failure modes with the symptoms exhibited by the vehicle.

Vehicle manufacturers commonly develop fault models from a variety of different data sources. Also, given the enormous volume of warranty data available in electronic format, a need arises to automatically classify and cluster these documents in order to identify the best-practice diagnostic knowledge from the documents. These data sources include engineering data, service procedure documents, text verbatim records from customers and repair technicians, warranty data, and others. While all of these types of data sources can be useful for creating fault models, or classifying or clustering documents, these activities can be time-consuming, labor intensive, and in some cases somewhat subjective. In addition, manually-created fault models may not consistently capture all of the failures modes, symptoms, and correlations which exist in the vehicle systems. Similarly, the documents clustered or classified without taking into account term co-relationships, such as a part and a symptom, or a symptom and a service action, or a part and a failure mode, may not provide accurate best-practice diagnosis knowledge discovery from the clustered documents. Therefore, methods have been developed to automatically extract diagnosis data that can be used for fault model construction or classifying/clustering documents by establishing correct correlation between the terms extracted from various types of documents. It is particularly challenging to extract diagnosis data from unstructured documents, such as those containing text verbatim data from repair technicians, as these documents typically contain sentence fragments, abbreviations, misspellings, and other shorthand notation which makes analysis difficult. Nonetheless, these unstructured text documents may contain a wealth of service history information which can be valuable to include in fault models or can be used to classify/cluster documents correctly.

There is a need for a methodology which enables the extraction of diagnosis data from unstructured text documents, such as service technician text verbatim documents, by establishing valid term co-relationships. The term co-relationship data can be used in an overall fault model development methodology, to improve the efficiency and accuracy of fault model creation from unstructured text documents. This data can also be used to classify/cluster documents correctly and meaningfully to be able to discover best-practice diagnosis knowledge.

SUMMARY OF THE INVENTION

In accordance with the teachings of the present invention, a method and system are disclosed for splitting a text document into individual sentences using sentence boundary detection, and establishing co-relationships between terms which are present in the same sentence. A document corpus, or collection of text records, is provided, containing text with terms to be extracted. The text records in the document corpus are divided into individual sentences, using a set of rules for sentence boundary detection. The individual sentences are then analyzed to extract and correlate terms, such as parts and symptoms, symptoms and actions, or parts and failure modes. The correlated terms are then validated based on frequency of occurrence, with term pairs being considered valid if their frequency of occurrence exceeds a minimum frequency threshold. The validated term correlations can be used for fault model development, document classification, and document clustering.

Additional features of the present invention will become apparent from the following description and appended claims, taken in conjunction with the accompanying drawings.

DETAILED DESCRIPTION OF THE EMBODIMENTS

Figure 1:
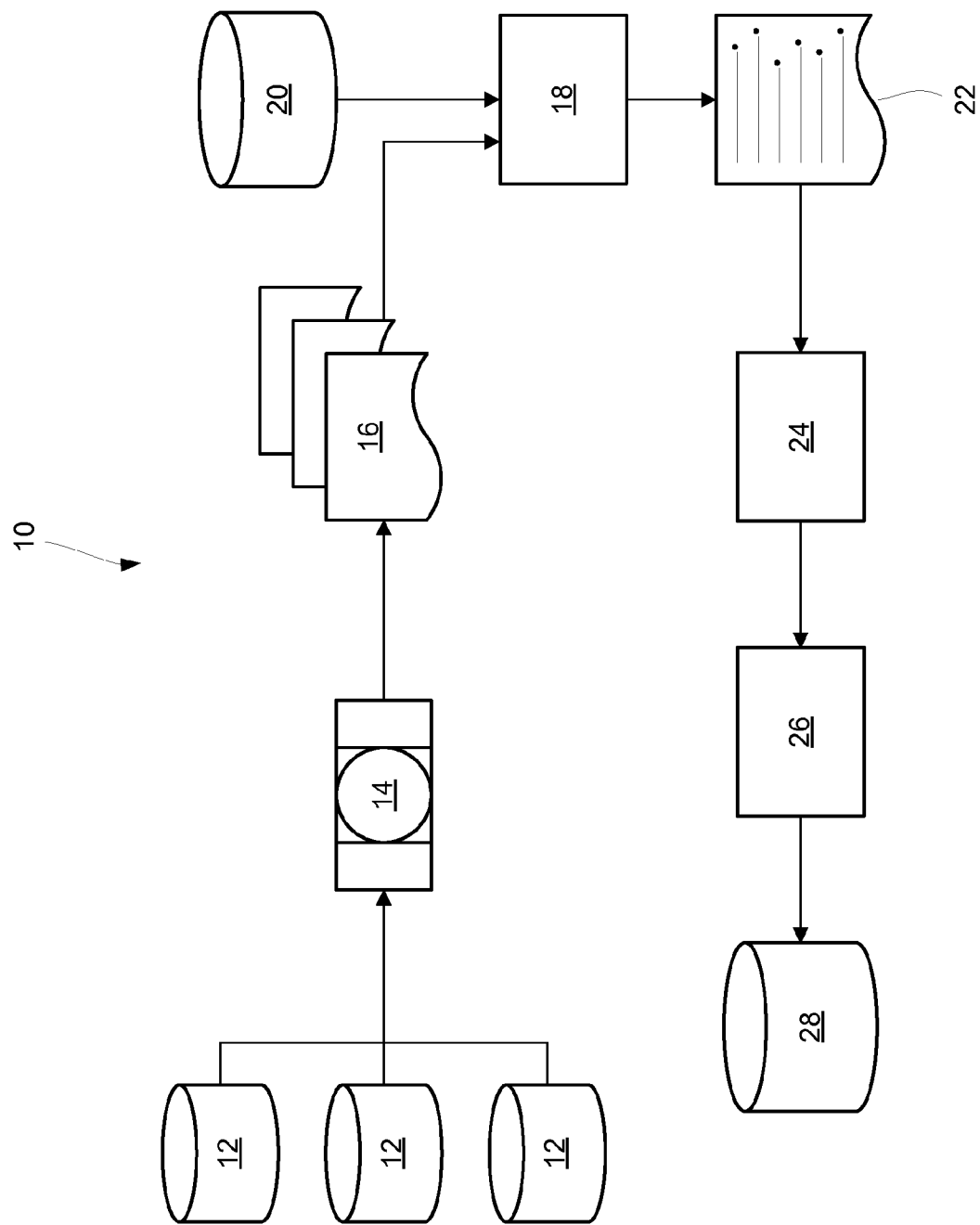
FIG. 1 is a block diagram of a system for detecting sentence boundaries in unstructured text documents, and using the sentence boundaries to establish term co-relationships.

The following discussion of the embodiments of the invention directed to a methodology for establishing term co-relationship using sentence boundary detection is merely exemplary in nature, and is in no way intended to limit the invention or its applications or uses. For example, the present invention has particular application to analyzing text documents relating to vehicle fault diagnosis. However, the invention is equally applicable to documents used for fault diagnosis in other industries, such as aerospace and heavy equipment, and to documents used for fault diagnosis in any mechanical, electrical, or electro-mechanical system where fault models are used.

In Original Equipment Manufacturing (OEM) industries, different techniques and tools, such as fault models, document classification, document clustering, have been established for identifying the best-practice diagnosis knowledge and correcting problems experienced by products in service. Fault models are an established tool used by product manufacturers for diagnosing and correcting problems experienced by products in service. The ability to develop complete and accurate fault models, or meaningful classification/clustering of documents, is a valuable competency which is needed by any original equipment manufacturer. Many different types of documents which could be used for the correct and consistent development of fault diagnosis tools (e.g., fault model) typically exist in a product manufacturing company. However, many of these documents are relatively unstructured in nature, and are hence difficult to parse into accurate fault models. Also, each document could consist of several instances of parts, symptoms, failure modes, and service actions. It is crucial to correctly identify which symptom is associated with which part, and similarly which service action has been used to fix which symptom. Such a type of precise co-relationship established between different terms enhances effective and accurate development of fault models from these unstructured text documents, as well as performance of document classification/clustering. Sentence boundaries can be used to accurately establish the term co-relationships.

An example is provided to illustrate the value of establishing valid term co-relationships. In this example, an actual technician text verbatim record from a vehicle service event will be analyzed. The technician text verbatim record is as follows:

"Cust. states the vehicle stalls, the battery was first checked. Technician realized internal fault so performed replaced and reprogrammed and 0.7 olh was claimed, e.g. BCM".

This example contains several terms relevant to fault model development, including parts (vehicle; battery; and BCM, or Body Control Module), a symptom (stalls), a failure mode (internal fault), and service actions (checked; replaced and reprogrammed). It can also be seen in this example that various abbreviations and acronyms are used, and sentence grammar is somewhat fragmented. If the example text verbatim record is analyzed in total, in absence of sentence boundary detection, several incorrect term co-relationships could be deduced, such as "vehicle internal fault", or "battery stalls". With accurate sentence boundary detection, only relevant term co-relationships will be established, such as "vehicle stalls", "battery checked", and "BCM replaced and reprogrammed".

FIG. 1 is a block diagram of a system 10 for detecting sentence boundaries in unstructured text documents, and using the sentence boundaries to establish term co-relationships. A number of data sources 12 contain text data which describes a system, such as a vehicle. The data sources 12 which are of interest in the system 10 are those which describe parts, symptoms, failure modes, and service actions. The data sources 12 may include design requirements documents, customer concerns, service technician verbatim comments, service procedures and bulletins, and other types of documents.

A filtering application 14 can be used to select specific text records from the data sources 12. As an example, in a vehicle manufacturing company, one of the data sources 12 could be text verbatim records from service technicians who performed service work on vehicles. Just this one part of the data sources 12 would include many millions of data records, covering thousands of repair facilities and millions of vehicles worldwide. Hence the need for the filtering application 14, to allow the selection of a sub-set of text records of interest. The filtering application 14 could be designed to allow the selection of a vehicle model year, a brand and model. The filtering application 14 could then allow the selection of a claim period—or start date and end date during which the service work was performed. This would be followed by the selection of a labor code—or the type of service work that was performed, such as engine, suspension, or electrical. The output of the filtering application 14 is a document corpus 16 which contains the text data to be analyzed. For example, the document corpus 16 may include all service technician verbatim comments for 2007 model year cars of Brand X and Model Y, for engine-related service work performed between Jan. 1, 2007 and Dec. 31, 2009.

The document corpus 16 is provided to a sentence boundary detection module 18, where the text contained in the document corpus 16 is analyzed, one record at a time, to identify complete sentences. The sentence boundary detection module 18 uses a rule base 20 to identify valid sentence endings. Identifying valid sentence endings is not a trivial task, as the period character is often used in contexts other than to designate a sentence ending. In just the one example above, periods are used in abbreviations, acronyms, and decimal numbers, as well as for sentence ending punctuation. Thus, a complete set of rules for identifying valid sentence endings is essential for accurate sentence boundary detection. A number of specific rules, contained in the rule base 20, are listed in Table 1. It is noteworthy that the rules shown in Table 1 can be used in conjunction with each other to handle different cases. The rule notation shown in Table 1 is illustrated in the Example column, and explained in detail below.

TABLE 1

| # | Rule | Example | Sentence Ending? |
|---|------|---------|------------------|
| 1 | L(token with a period) - space - R(first token character capitalized) | "Dead battery. Replaced the ___" | Yes |
| 2 | L(abbreviation with a period) - space - R(first token character capitalized) | "BCM is ck. Reprogrammed and replaced the ___" | Yes |
| 3 | L(abbreviation with a period) - space - R(first token character not capitalized) | "Customer states bat. has a leak, and ___" | No |
| 4 | L(integer) - no_space -.- R(integer) - space - R(one or more tokens) | "Battery was replaced and 0.5 olh was claimed ___" | No |
| 5 | L(integer) - no_space -.- R(integer) -.- R(no tokens- end of record) | "Battery was replaced and 0.5." | Yes |
| 6 | L(alphabet) -.- no_space - R(alphabet) -.- R(one or more tokens) | "The olh was claimed, e.g. for replacing BCM" | No |
| 7 | L(alphabet) -.- no_space - R(alphabet)-R(one or more tokens) | "The olh was claimed, e.g for replacing BCM" | No |

TABLE 1-continued

| # | Rule | Example | Sentence Ending? |
|---|------|---------|------------------|
| 8 | L(alphabet) -.- no_space - R(alphabet) -.- R(no tokens - end of record) | "Meet at 5 p.m." | Yes |
| 9 | no_space -.- space - R(integer) - space - R(one or more tokens) | ".6 additional time was taken to replace BCM" | No |
| 10 | L(token or abbreviation) - space or no_space - . . . - space or no_space - R(token or abbreviation, or end of record) | "The olh was claimed . . . " | No |

Rule 1 is a straightforward example of a period used for a sentence ending. In Rule 1, on the left (L) is a token, or word, followed by a period. This is followed by a space, which is followed on the right (R) by a token, or word, with the first letter capitalized. As indicated by the "Yes" in the right-most column of Table 1, if a text string which follows the pattern of Rule 1 is found, the period in that text string is designated as a valid sentence ending. Rule 2 follows a similar pattern to Rule 1, except that the token preceding the period is an abbreviation. As indicated, Rule 2 still recognizes this as a valid sentence ending. Rule 3 follows a similar pattern to Rule 2, except that the first character of the right token, following the period and space, is not capitalized. In this case, the period is determined to be used solely for the abbreviation, and not to be a sentence ending period.

Rules 4, 5, and 9 deal with distinguishing periods from decimal points. In Rule 4, a standard decimal number of the form x.y is determined not to contain a sentence ending period. In Rule 5, where a standard decimal number is followed by another point or period, that is, x.y., the last character is determined to be a sentence ending period. Rule 9 handles situations where a space is inadvertently inserted between a decimal point and a digit; this is not considered to be a sentence ending period.

Rules 6, 7, and 8 deal with periods used in abbreviations and acronyms. These rules are able to distinguish in what situations those periods actually do designate sentence endings, in addition to their meaning in the abbreviation or acronym. Rule 10 handles the usage of three periods as an ellipsis.

Other rules may be added, for example, if new forms of abbreviation shorthand are identified. The sentence boundary detection module 18 applies the rules in the rule base 20, as contained in Table 1, to each record in the document corpus 16, to produce a list of sentences 22. The list of sentences 22 contains all of the contents of the document corpus 16, separated into individual sentences. The list of sentences 22 is provided to a term extraction and correlation module 24.

The term extraction and correlation module 24 extracts terms from the list of sentences 22, and correlates them into tuples, or ordered lists, based on the sentence boundaries. The tuples are most commonly pairs, such as a part and a symptom, or a symptom and a service action, or a part and a failure mode. However, triples may also be formed. It is presumed that terms which appear in the same sentence have a high degree of co-relationship which is valid to capture. Conversely, by only establishing co-relationships for terms that appear in the same sentence, irrelevant or meaningless co-relationships are avoided—such as the "battery stalls" example cited previously. It is worth repeating for emphasis—in the example technician verbatim record discussed previously, even though the part "battery" and the symptom "stalls" appear in close proximity in the technician verbatim record, they do not appear in the same sentence, so no co-relationship is established for "battery stalls" by the term extraction and correlation module 24.

The correlated term tuples are provided to validation module 26 where they are analyzed and validated based on aggregate frequency of occurrence. The purpose of the validation module 26 is to determine which of the correlated term tuples are valid, based on their frequency of occurrence in the document corpus 16. That is, if a specific term tuple only appears once among thousands of term tuples extracted from the document corpus 16, that specific term tuple is likely not worth including in the validated term output data.

For each correlated tuple, such as a part and a symptom, or a symptom and an action, or a part and a failure mode, a frequency of occurrence is calculated. The validation module 26 can use any algorithm suitable for the purpose. In general, the algorithm will calculate the frequency of occurrence as a function of the number of occurrences of a given tuple in a particular technician verbatim record, and the ratio of technician verbatim records containing the given tuple to the total number of technician verbatim records in the document corpus 16. Such an algorithm with give a higher frequency of occurrence value to tuples which occur more than once in a particular verbatim record, and to tuples which occur in multiple different verbatim records in the document corpus 16.

Once the frequency of occurrence is calculated for all tuples, the tuples are sorted in order of descending frequency, and only the tuples with frequency above a minimum frequency threshold are considered as valid. The minimum frequency threshold can be determined for each unique instance of the document corpus 16. Terms which are validated by the validation module 26 are output to validated term correlation database 28, where they are used to facilitate the building of fault models from text documents, or used for document classification/clustering in order to discover best-practice diagnostic knowledge. Again, the most common form of output from the validation module 26 is a pair of correlated terms, such as a part and failure mode.

Figure 2:
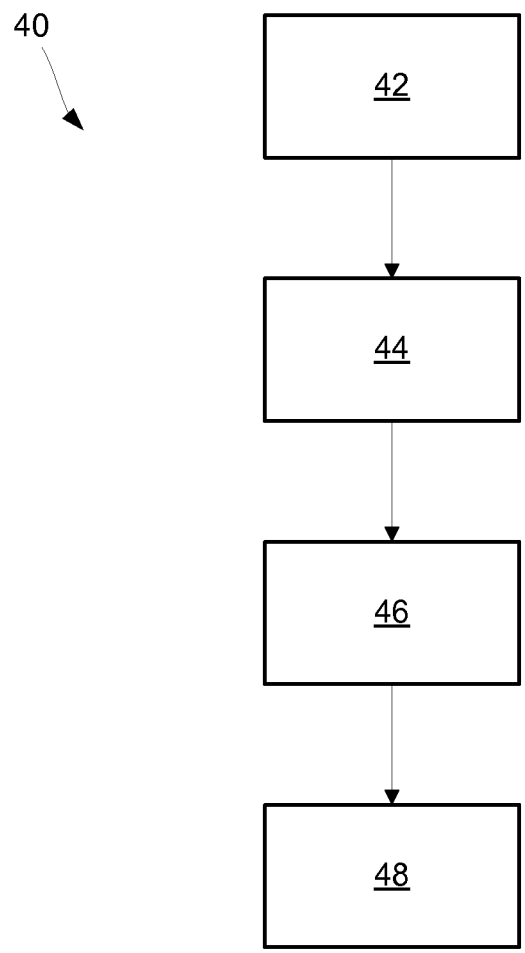
FIG. 2 is a flow chart diagram of a method for detecting sentence boundaries in unstructured text documents, and using the sentence boundaries to establish term co-relationships.

FIG. 2 is a flow chart diagram 40 of a method for detecting sentence boundaries in unstructured text documents, and using the sentence boundaries to establish term co-relationships, as implemented in the system 10 of FIG. 1. At box 42, the document corpus 16 is provided. The document corpus 16 could comprise text verbatim records from service technicians, or other text data containing terms to be extracted. As discussed previously, the filtering application 14 can be used to create the document corpus 16 from the data sources 12. At box 44, the document corpus 16 is analyzed to identify sentence boundaries and produce the list of sentences 22. The rule base 20 can be used to define the rules establishing which period characters in the document corpus 16 represent the end of a sentence.

At box 46, terms are extracted and co-relationships between terms are established, using the list of sentences 22 as input. As discussed above, using the sentence boundaries to establish term co-relationships dramatically improves the quality of term extraction and correlation. At box 48, the correlated term tuples from the box 46 are validated if their frequency of occurrence exceeds a minimum frequency threshold. The output of the box 48 is the validated term correlation database 28, which can be used for the development of fault models or for classifying/clustering documents for meaningful discovery of the best-practice diagnosis knowledge.

Testing of the methodology described above has shown that the precision and recall of identifying term co-relationships—that is, the number of relevant term pairs identified in a document divided by the total number of relevant pairs which exist in the document—is dramatically improved using sentence boundary detection. Reliably establishing term co-relationships using sentence boundary detection provides a foundation for building improved fault models and systematic document classification/clustering, which in turn enable a product manufacturer to improve the quality and serviceability of its products.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for establishing term co-relationships using sentence boundaries, said method comprising:

providing a document corpus containing text data to be analyzed;

analyzing the document corpus, using a microprocessor, to identify sentence boundaries and produce a list of sentences, including applying rules from a rule base to each text record in the document corpus, where the rules are used to identify periods which designate valid sentence endings, and the rule base includes establishing a sentence ending where a word ends with a period, followed by one or more spaces, followed by a word beginning with a capital letter, establishing a sentence ending where an abbreviation ends with a period, followed by one or more spaces, followed by a word beginning with a capital letter, not establishing a sentence ending where an abbreviation ends with a period, followed by one or more spaces, followed by a word beginning with a lower case letter, not establishing a sentence ending where a numeral is followed by a period, followed by one or more numerals, followed by a space, followed by one or more words, establishing a sentence ending where a numeral is followed by a first period, followed by one or more numerals, followed by a second period, where the sentence ending is at the second period, not establishing a sentence ending where a letter is followed by a period, followed by another letter, followed by another period, followed by one or more words, not establishing a sentence ending where a letter is followed by a period, followed by another letter, followed by one or more words, establishing a sentence ending where a letter is followed by a first period, followed by another letter, followed by a second period, followed by nothing else in the text record, where the sentence ending is at the second period, not establishing a sentence ending where a period is preceded by no space and followed by a space, followed by a numeral, followed by a space, followed by one or more words, and not establishing a sentence ending where an ellipsis appears in a sentence;

extracting terms and establishing term correlations from the list of sentences; and validating the term correlations to produce a validated term correlation database.

2. The method of claim 1 wherein providing a document corpus includes providing one or more data sources, and filtering data from the one or more data sources to produce the document corpus.

3. The method of claim 1 wherein extracting terms and establishing term correlations includes forming tuples of correlated terms.

4. The method of claim 3 wherein validating the term correlations includes calculating a frequency of occurrence of each of the tuples of correlated terms, and comparing the frequency of occurrence to a minimum frequency threshold.

5. The method of claim 4 wherein calculating a frequency of occurrence includes counting a number of times each of the tuples of correlated terms appears in the document corpus, and comparing the number of times to a total number of tuples of correlated terms in the document corpus.

6. The method of claim 1 wherein the terms include parts, symptoms, failure modes, and service actions.

7. The method of claim 1 wherein the text data to be analyzed includes service technician text verbatim records.

8. The method of claim 1 wherein the validated term correlation database is used for fault model development.

9. A method for using sentence boundaries to establish term co-relationships for fault model development, said method comprising:

providing a document corpus containing service technician text verbatim records to be analyzed;

analyzing the document corpus, using a microprocessor, to identify sentence boundaries and produce a list of sentences, including applying rules from a rule base to each text record in the document corpus, where the rules are used to identify periods which designate valid sentence endings, and the rule base includes establishing a sentence ending where a word ends with a period, followed by one or more spaces, followed by a word beginning with a capital letter, establishing a sentence ending where an abbreviation ends with a period, followed by one or more spaces, followed by a word beginning with a capital letter, not establishing a sentence ending where an abbreviation ends with a period, followed by one or more spaces, followed by a word beginning with a lower case letter, not establishing a sentence ending where a numeral is followed by a period, followed by one or more numerals, followed by a space, followed by one or more words, establishing a sentence ending where a numeral is followed by a first period, followed by one or more numerals, followed by a second period, where the sentence ending is at the second period, not establishing a sentence ending where a letter is followed by a period, followed by another letter, followed by another period, followed by one or more words, not establishing a sentence ending where a letter is followed by a period, followed by another letter, followed by one or more words, establishing a sentence ending where a letter is followed by a first period, followed by another letter, followed by a second period, followed by nothing else in the text record, where the sentence ending is at the second period, not establishing a sentence ending where a period is preceded by no space and followed by a space, followed by a numeral, followed by a space, followed by one or more words, and not establishing a sentence ending where an ellipsis appears in a sentence;

extracting terms and establishing term correlations from the list of sentences, where the terms include parts, symptoms, failure modes, and service actions; and validating the term correlations to produce a validated term correlation database.

10. The method of claim 9 wherein providing a document corpus includes providing one or more data sources, and filtering data from the one or more data sources to produce the document corpus.

11. The method of claim 9 wherein extracting terms and establishing term correlations includes forming tuples of correlated terms.

12. A system for establishing term co-relationships using sentence boundaries, said system comprising:

a rule base, residing in a memory, containing rules for identifying sentence-ending periods;

a microprocessor coupled to the memory, said microprocessor being configured with:

a sentence boundary detection module for applying the rules in the rule base to text records contained in a document corpus, and producing a list of sentences, where the rules are used to identify periods which designate valid sentence endings, and the rule base includes establishing a sentence ending where a word ends with a period, followed by one or more spaces, followed by a word beginning with a capital letter, establishing a sentence ending where an abbreviation ends with a period, followed by one or more spaces, followed by a word beginning with a capital letter, not establishing a sentence ending where an abbreviation ends with a period, followed by one or more spaces, followed by a word beginning with a lower case letter, not establishing a sentence ending where a numeral is followed by a period, followed by one or more numerals, followed by a space, followed by one or more words, establishing a sentence ending where a numeral is followed by a first period, followed by one or more numerals, followed by a second period, where the sentence ending is at the second period, not establishing a sentence ending where a letter is followed by a period, followed by another letter, followed by another period, followed by one or more words, not establishing a sentence ending where a letter is followed by a period, followed by another letter, followed by one or more words, establishing a sentence ending where a letter is followed by a first period, followed by another letter, followed by a second period, followed by nothing else in the text record, where the sentence ending is at the second period, not establishing a sentence ending where a period is preceded by no space and followed by a space, followed by a numeral, followed by a space, followed by one or more words, and not establishing a sentence ending where an ellipsis appears in a sentence;

an extraction and correlation module for extracting terms from the list of sentences and establishing correlations between the terms based on sentence boundaries; and a validation module for validating the correlations between the terms based on frequency of occurrence.

13. The system of claim 12 further comprising a filtering application for creating the document corpus from a plurality of text data sources.

14. The system of claim 13 wherein the validation module counts a number of appearances of each tuple of correlated terms in the document corpus, determines the frequency of occurrence based on the number of appearances and a total number of tuples of correlated terms in the document corpus, and compares the frequency of occurrence to a minimum frequency threshold to identify valid term correlations.

15. The system of claim 14 wherein the validation module outputs the valid term correlations to a validated term correlation database to be used for fault model development, or to classify or cluster documents in order to discover best practice diagnostic knowledge from the documents.

16. The system of claim 14 wherein the terms include parts, symptoms, failure modes, and service actions.

* * * * *